United States Patent
Tait (10) Patent No.: US 9,605,839 B2
(45) Date of Patent: Mar. 28, 2017

(54) PURSELIGHT WITH EL AND LED LIGHT SOURCES

(71) Applicant: Strabo Pro Productions, Inc., Las Vegas, NV (US)

(72) Inventor: Cynthia K. Tait, Riverside, CA (US)

(*) Notice: Subject to any disclaimer, the term of this patent is extended or adjusted under 35 U.S.C. 154(b) by 124 days.

(21) Appl. No.: 14/509,293

(22) Filed: Oct. 8, 2014

(65) Prior Publication Data
US 2015/0062879 A1    Mar. 5, 2015

Related U.S. Application Data

(63) Continuation-in-part of application No. 13/397,797, filed on Feb. 16, 2012, now Pat. No. 8,882,288.

(51) Int. Cl.
| | |
|---|---|
| A45C 15/06 | (2006.01) |
| F21V 23/04 | (2006.01) |
| F21V 33/00 | (2006.01) |
| A45C 3/06 | (2006.01) |
| A45C 13/08 | (2006.01) |
| F21Y 101/00 | (2016.01) |

(52) U.S. Cl.
CPC .......... *F21V 23/04* (2013.01); *A45C 3/06* (2013.01); *A45C 13/08* (2013.01); *A45C 15/06* (2013.01); *F21V 33/0008* (2013.01); *F21Y 2101/00* (2013.01); *Y10S 362/80* (2013.01)

(58) Field of Classification Search
CPC  A45C 3/06; A45C 13/08; A45C 15/06; F21V 23/04; F21V 33/0008; F21Y 2101/00; Y10S 362/80
USPC .......................................................... 362/156
See application file for complete search history.

(56) References Cited

U.S. PATENT DOCUMENTS

| | | | | |
|---|---|---|---|---|
| 4,909,189 | A * | 3/1990 | Minotti | A01K 27/006 119/859 |
| 5,138,538 | A * | 8/1992 | Sperling | F21L 4/00 200/60 |
| 5,268,827 | A * | 12/1993 | Granneman | A45C 15/06 362/156 |
| 6,082,867 | A * | 7/2000 | Chien | A43B 1/0072 313/512 |
| 2004/0141314 | A1* | 7/2004 | Vautrin | A45C 15/06 362/156 |
| 2005/0057923 | A1* | 3/2005 | Catherine Kurcz | A45C 15/06 362/156 |
| 2006/0082987 | A1* | 4/2006 | Dorsey | F21S 48/215 362/103 |
| 2011/0098058 | A1* | 4/2011 | Mahalingam | G06Q 30/0603 455/456.1 |
| 2011/0149559 | A1* | 6/2011 | Fuqua, Jr. | G01S 5/0027 362/183 |

\* cited by examiner

*Primary Examiner* — Laura Tso
*Assistant Examiner* — Naomi M Wolford
(74) *Attorney, Agent, or Firm* — Jennifer Meredith, Esq.; Meredith & Keyhani, PLLC (57) ABSTRACT

A purse illumination assembly including a power source, a light emitting portion, a voice-sensitive switch, and a circuit assembly connecting the light emitting portion to the power source through the voice-sensitive switch. The light emitting portion may be a light emitting fabric or may include EL wire alone or in combination with LED lights to provide both lighting and a decorative effect. A driver circuit may be included for driving both the EL wire and the LED lights.

26 Claims, 11 Drawing Sheets

| ITEM | P/L QTY | P/N | TITLE | DETAIL | REF | PKG |
|---|---|---|---|---|---|---|
| 1 | 1 | 179-93-004 | PCB BLANK, PURSE LIGHT | REV A - FAB 2L | | |
| 2 | 1 | 12/15/2014 | CAP S210, CER, 1000pF, 50V, X7R, 0603 | PAN ECJ-1VB1H102K | C2 | CAPN-0603 |
| 3 | 1 | 12/15/1942 | CAP S227, CER, 2.7nF, 10%, X7R 100V, 0603 | AVX 06031C272KAT2A | C8 | CAPN-0603 |
| 4 | 1 | 12/15/2019 | CAP S310, CER, 0.01uF, 50V, X7R, 100V, 0603 | PAN ECJ-1VB1H103K | C5 | CAPN-0603 |
| 5 | 2 | 12/15/2003 | CAP S410, CER, 0.10 uF, 16V, 0603, 10% | PAN ECJ-1VB1C104K | C6 C7 | CAPN-0603 |
| 6 | 1 | 12/15/2016 | CAP S422, CER, 0.22uF, 25V, X7R, 1206 | PAN ECJ-3VB1E224K PANA ECJ-3YB1E47 | C3 | CAPN-1206 |
| 7 | 1 | 12/15/1930 | CAP S510, CER, 1.0uF, 25V, X5R, 0805 | PAN ECJ-2FB1E105K | C1 | CAPN-0805 |
| 8 | 1 | 12/15/1937 | CAP S547, TANT, 4.7uF, 16V, EIA-A, 20% | KEMET T491A475K016AT | C4 | CAPP-EIA-A |
| 9 | 3 | 005-00-073 | CONN, HDR-KK, 2 PIN, 1x2, STR KEY | MOLEX 22-23-2021 | J1-J3 | CN-KK02 |
| 10 | 1 | 017-00-030 | DIODE, 300mA 75V, 1N914 SOT23 | FAIRCH MMBD914 | D9 | SOT23 |
| 11 | 1 | 017-15-005 | DIODE, 1A 100V, S1B, SMB | DIODESINC, S1BB-13-F | D11 | DIO-SMB |
| 12 | 1 | 017-00-012 | DIODE, SCHOTTKY, 1A 40V, 10BQ040, SMB | IR 10BQ040PBF | D4 | DO214AA |
| 13 | 1 | 017-35-002 | FET-N 2N7002, 60V, 155mA, SOT23 | 2N7002 FAIRCHILD | Q2 | SOT23 |
| 14 | 1 | 017-35-010 | FET-N FDN337N, 30V, 2.2A SOT23 | FAIRCH FDN337N | Q1 | SOT23 |
| 15 | 1 | 020-00-523 | IC, EL DRIVER, MIC4830, MSOP-08 | MIC MIC4830YMM | U3 | MSOP08-12 |
| 16 | 1 | 020-00-524 | IC, LED DRIVER, WHITE, MIC2287C, SOT23-5 | MIC MIC2287CYD5 | U1 | SOT23-5 |
| 17 | 1 | 020-00-522 | IC, TIMER, 555, TS555CD | STM TS555CD | U2 | SOIC-08 |
| 18 | 1 | 013-10-020 | INDUCTOR, 10uH, 1.84A SMT | SUMIDA CDRH74NP-100MC | L1 | IND-CDRH74 |
| 19 | 1 | 013-10-022 | INDUCTOR, 220uHM 500mA, SMT | PULSE P07520.224NLT | L2 | IND-S140104 |
| 20 | 2 | 015-10-067 | LED, PLCC, RED, TOP | OSRAM LR E6SF-V2AB-1-1-Z | D1 D2 | PLCC-4 |
| 21 | 4 | 015-10-066 | LED, PLCC, WHITE, YELLOW LENS | LITE-ON LTW-673DT | D5-D8 | PLCC-4 |
| 22 | 1 | 011-15-073 | RES, SMT 0805 1% 00100, 10.0 OHM | PAN ERJ-6ENF10R0V | R5 | RES-0805 |
| 23 | 1 | 011-15-084 | RES, SMT 0805 1% 1562, 562 OHM | PAN ERJ-6ENF5620V | R1 | RES-0805 |
| 24 | 1 | 011-15-055 | RES, SMT 0805 1% 3200, 20.0K | PAN ERJ-6ENF2002V | R6 | RES-0805 |
| 25 | 1 | 011-15-077 | RES, SMT 0805 1% 3221, 22.1K | PAN ERJ-6ENF2212V | R2 | RES-0805 |
| 26 | 1 | 011-15-090 | RES, SMT 0805 1% 4332, 332K | PAN ERJ-6ENF3323V | R7 | RES-0805 |
| 27 | 1 | 011-15-089 | RES, SMT 0805 1% 5178, 1.78 MEG | VISH CRCW08051M78FKEA | R8 | RES-0805 |
| 28 | 1 | 011-15-088 | RES, SMT 0805 1% 5430, 4.30 MEG | VISH CRCW08054M30FKEA | R4 | RES-0805 |
| 29 | 1 | 011-15-078 | RES, SMT 0805 1% 6100, 10.0 MEG | PAN ERJ-6ENF1005V | R3 | RES-0805 |
| 30 | 7 | 005-00-036 | TEST POINT, 0.055 DIAMETER, BLACK | MOUSER 151-203-RC, KEYSTONE 5001 | TP1 TP3-TP8 | TP |
| 31 | 1 | 005-00-057 | TEST POINT, SMT, 0.15x0.09in | COMPCORP, TP-107-02 | TP2 | TP-S |
| 32 | 2 | 017-00-039 | TRANSZORB 12V, SMBJ12A, 600W UNI, SMT | GENSEMI SMBJ12A | D3 D10 | DO214AA |
| 33 | 1 | 179-97-004 | LABEL, PCB ASSY, PURSE LIGHT | ASSY SN | | |

PURSELIGHT WITH EL AND LED LIGHT SOURCES

CROSS-REFERENCE TO RELATED APPLICATIONS

The present application is a continuation-in-part of co-pending application Ser. No. 13/397,797 filed Feb. 16, 2012, which is a continuation-in-part of application Ser. No. 12/560,010 filed Sep. 15, 2009 which in turn claims priority to Ser. No. 11/676,006 filed in the U.S. Patent and Trademark Office on Feb. 16, 2007, which in turn claims priority to application Ser. No. 10/746,470 filed in the U.S. Patent and Trademark Office on Dec. 23, 2003, and issued as U.S. Pat. No. 7,207,689 on Apr. 24, 2007, the entire contents of all of which are incorporated by this reference.

BACKGROUND OF THE INVENTION

1. Field of the Invention

The present invention generally relates to illumination devices specifically for use in purses, handbags and backpacks that allow the user to easily activate and illuminate its interior.

2. Description of Related Art

The use of lights as a means for illuminating a purse is known within the art. These may include traditional pocket lamps that hang from a strap down into a purse and must be switched on by the user or light systems built into a purse, which would illuminate upon opening the purse.

By way of example, U.S. Pat. No. 6,447,142 issued to Weir describes a purse light system. The purse light system is a purse with a built-in light system, which includes a purse outer structure, a battery pack and a light assembly positioned to emit light into the purse chamber. The purse lighting system automatically switches on when the purse opening is in the open position and off when the purse opening is in the closed position. This invention lights the purse from the top of the purse.

Another purse lighting system, U.S. Pat. No. 5,424,926 issued to Meyers describes a purse light. This purse light includes a light for illuminating the interior of a purse, consisting of a mounting assembly housing a light bulb, a reflector to direct the light towards a diffusing lens which projects the light in a multitude of directions and a digital clock.

U.S. Pat. No. 6,508,568 issued to Blue-Recio discloses yet another light assembly for the interior of a purse. This light assembly consists of a mounting structure to secure the assembly to the inside of a bag, an illumination source which projects light to the interior of the bag, and a switch the user must push to turn the purse light on. The switching mechanism for the '598 patent may allow for the lamp to be inadvertently switched on by pressure from items within the purse and may also allow for the lamp to be inadvertently left on by the user, both instances may result in complete discharge of the battery without the knowledge of the user.

U.S. Pat. No. 4,742,438 issued to King describes a light for the interior of a purse, having a light bulb, an electric power supply mounted within a translucent housing which is temporarily mounted on a mounting bracket which is permanently attached to the inside of a purse. The '438 patent is cumbersome and impractical because it requires mounting brackets to be permanently mounted on the interior of a purse.

U.S. Patent Application Publication No. 2002/0067610 to Marshal discloses a lighted and content-organizing carrying case for illuminating the main compartment and organizing the contents in the carrying case. The lighted and content-organizing carrying case includes a handbag assembly and also includes light-emitting assemblies removably attached to the bag. The light-emitting means includes tubular light-emitting holders each having a side wall and an open end, and also includes light-emitting members being disposed in the tubular light-emitting holders, and further includes batteries conventionally disposed in the light-emitting holders and being connected with wires to the light-emitting members, and also includes on/off switches being movably and conventionally disposed at the open ends of the light-emitting holders and being connected with the wires to the light-emitting members and to the batteries for energizing the light-emitting members, and further includes hook and loop fasteners being securely and conventionally attached to an exterior of the side walls of the light-emitting holders and to one of the walls of the bag in the main compartment for removably fastening the light-emitting holders to the bag. Each of the light-emitting holders includes a plurality of holes being spaced apart and along a length of and disposed through the side wall thereof with each of the holes being adapted to receive a respective light-emitting member which is extended through the hole. The assembly of Marshall appears quite bulky and requires several parts in order to operate. The switch is located at the top and appears to work by being pressed in.

U.S. Pat. No. 4,234,907 to Daniel discloses a light emitting fabric in which optical fibers are part of the weave, replacing some of the threaded fibers, whereby the fabric is uniformly illuminated and, accordingly, decorated. The individual optical fibers are gathered into a bundle at one end of the fabric and illuminated by a light source. Light traveling through the fibers is emitted in small amounts throughout the lengths thereof through small scratches that pierce the outer coating. Uniformity and intensity of light are enhanced by providing a reflective coating on the non-illuminated ends of the optical fibers. According to '907, this fabric is usable in clothing; such as costumes, high visibility safety clothing, suntan suits; rugs, draperies, theater curtains, architectural panels, fiberglass boat hulls, and the like. Because the fibers are all bundled and connected to the same light source, they are lit together.

U.S. Pat. No. 4,992,704 to Stinson discloses a light emitting diode (LED) or lamp that is programmable to emit a variety of colors or hues at the selection of the user having a unitary housing of clear molded solid epoxy supporting three light dies characterized as producing color hues of red, green and blue respectively. A common cathode is supported in the housing and wire leads interconnect the anode of each light die with the common cathode. Control circuits are operably coupled to anode leads and a common cathode lead for selectively energizing the light die anodes so that their respective color outputs visually combine to produce a desired color or hue.

The references that are related to LED and light fabric have no mention of purselights. The references that disclose some type of purselight include assemblies that have many parts and are therefore quite cumbersome to build and operate, do not provide light from the bottom of the bag upward, include pressure activated switches that may be turned on accidentally by the items in the bag and provide point light sources and discontinuous sources of light. Some of the shortcomings of the above are addressed by the aspects of the present invention.

SUMMARY OF THE INVENTION

Aspects of the present invention provide an illumination method and system for a purse or bag that has a simple and elegant design to light the bag from the bottom and the sides, is turned on and off by a switching means, and may include LEDs that are used to generate a pattern of light. Some aspects of the present invention provide the use of light emitting fabrics that are soft and pliable and add very little to the total weight of the purse. Some aspects of the invention may include the use of electroluminescent (EL) wires that produce a continuous line of light.

Lighting a purse from the top down is not as effective as the present invention which emits ambient light from the bottom and side of the purse or handbag. Further, the push switch of prior art may be turned on and off accidentally from pressure from objects in the purse while the touch-sensitive switch of the present invention requires the touch of the user's fingers or hand. Light fabrics using LEDs are both suitable for the inside of a purse because of the pliability of the fabric and may be used on the outside of the purse to form various patterns. Point sources of the prior art require a hard casing and are not as aesthetically pleasing as a light fabric. Therefore, the use of such sources is limited to hidden areas of the purse. In addition to light fabrics that may be used on the outside of a purse, other aspects of the present invention provide a continuous wand of light using EL wire. This wand may be extended from the inside to the outside and is used both as a light source and for ornamentation. Here, the aesthetic feature provides the utility. Fiber optics does not provide the continuity of EL wire.

According to one embodiment, a purse illumination assembly is provided that includes a purse having at least two sides, wherein the inside of at least one of the at least two sides is light emitting fabric, a power source means operatively coupled to the light emitting fabric, and a switching means operatively coupled to the power source means.

According to one embodiment, a purse illumination assembly is provided that includes a purse having at least two sides, wherein the inside of at least one of the at least two sides is a light emitting fabric comprised of a piece of fabric with arrays of LED pixels mounted on a flexible plastic substrate and having an electrically conducting track on the flexible plastic substrate connecting each said LED pixel, a power source means operatively coupled to the light emitting fabric, and a switching means operatively coupled to the power source means.

According to one embodiment, a purse illumination assembly is provided that includes an EL wire to produce a continuous wand of light that may be extended from the inside to the outside of the purse.

Aspects of the present invention provide a purse illumination assembly, including a power source, a light emitting portion, a switching means, and a circuit assembly connecting the light emitting portion to the power source through the touch-sensitive switch. The light emitting portion includes a light emitting fabric, and the switch may be located in an indentation to protect against accidental switching on.

In one aspect, the circuit assembly includes a capacitive timing circuit to turn the light off after a predetermined period. In one aspect, wherein said light emitting fabric is selected from the group consisting of textile imbedded with LED, OLED, optical fibers or black light. In one aspect, the light emitting fabric includes a piece of fabric, a flexible substrate attached to the piece of fabric, arrays of LED pixels mounted on the flexible substrate, a waveguide between said LED pixels, and an electrically conducting track on said flexible substrate connecting and controlling the LED pixels, and each said LED pixel contains red, green and blue (RGB) LEDs. In one aspect, the light emitting fabric is encased in translucent water resistant material. In one aspect, the touch sensitive switching means is comprised of two non-intersecting electrical contacts. In one aspect, a voice activated switching means in communication with said switching means is also used in the purse illumination assembly. In one aspect, the light emitting fabric is used to illuminate an inside of a purse and an outside of the purse. In one aspect, the light emitting fabric may be sequenced to provide a dynamic display.

Aspects of the present invention also provide purse illumination assembly for illuminating a purse that includes a power source, a light emitting portion, a switching means, and a circuit assembly connecting the light emitting portion to the power source through the switching means. The light emitting portion includes an EL wire and a LED light both being driven by a driver circuit of the circuit assembly. The LED light is located outside the purse. The EL wire extends from an outside of the purse inside, and the touch-sensitive switch is located on a casing of the LED light.

In one aspect, the EL wire is shaped as a wand portion and the casing of the LED light has a flower-shaped cap. In one aspect, the wand portion is covered with crystals that diffuse light. In one aspect, the casing of the LED light has interchangeable decorative caps. In one aspect, the circuit assembly includes a transformer. In one aspect, the power source is rechargeable. In one aspect, the light emitting portion further includes a light emitting fabric.

BRIEF DESCRIPTION OF THE DRAWINGS

FIG. 10B shows exemplary implementation parameters for the driver of FIG. 10A.

DETAILED DESCRIPTION OF THE INVENTION

A purse illumination assembly is described that is used to illuminate a purse. The purse usually has two or more sides. The purse illumination assembly in some embodiments includes a light emitting fabric. In that case, the inside of at least one of the sides is at least partially covered with the light emitting fabric. The light illumination assembly includes a power source operatively coupled to the light emitting fabric and a switching means operatively coupled to the power source. The light emitting fabric may be encased in translucent water resistant material. A touch sensitive switching means may be in communication with the switching means.

The light emitting fabric, used in various embodiments of the present invention, may be electroluminescent strips, electroluminescent panels and/or selected from various types of light-emitting fabric including textile embedded with light emitting diodes (LEDs) or organic light emitting diodes (OLEDs), optical fibers, and black light. Photonic textile, which uses cloth as a lighted graphic display medium may also be used. Photonic textile integrates a flexible array of miniature LEDs into a piece of cloth, which allows the cloth to display graphics, text, and animation. Black light refers to the type of light that remains close to the ultraviolet range and is of low visibility to the eye unless used with fluorescent and phosphorescent material.

While optical fibers may be used for some aspects of the present invention, to provide ambient lighting that is capable of being programmed to provide a pattern, individual lights should be embedded in the fabric. The term embedded refers to the fact that the light is contained substantially within the fabric or substrate. The LEDs are not capable of moving around, as would be the case in a string of lights. The LEDs are fixedly attached to either the fabric or substrate.

Figure 1:
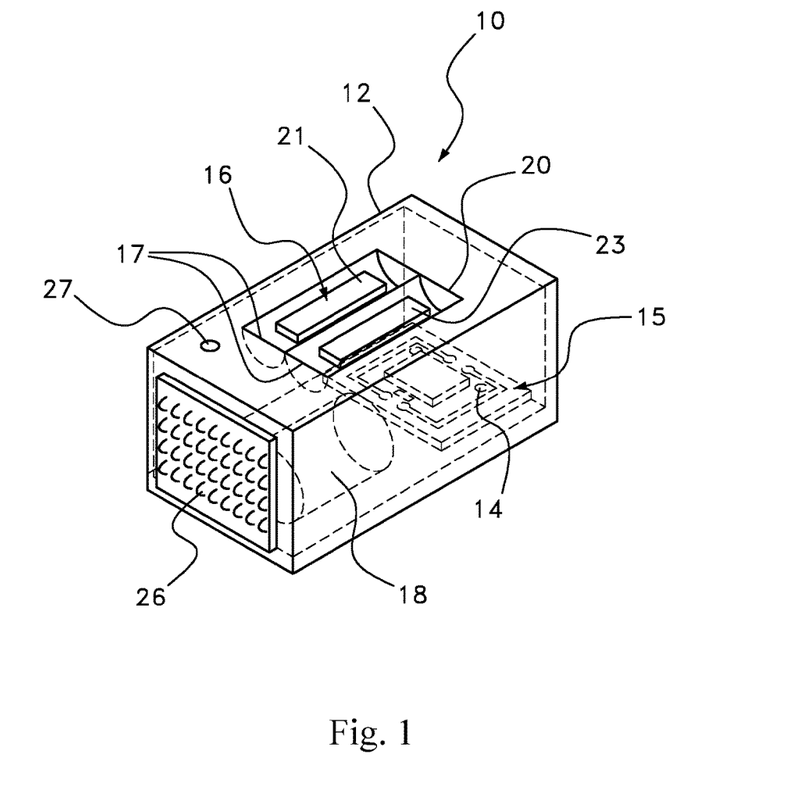
FIG. 1 shows a purse illumination assembly, according to the aspects of the present invention.
Figure 2:
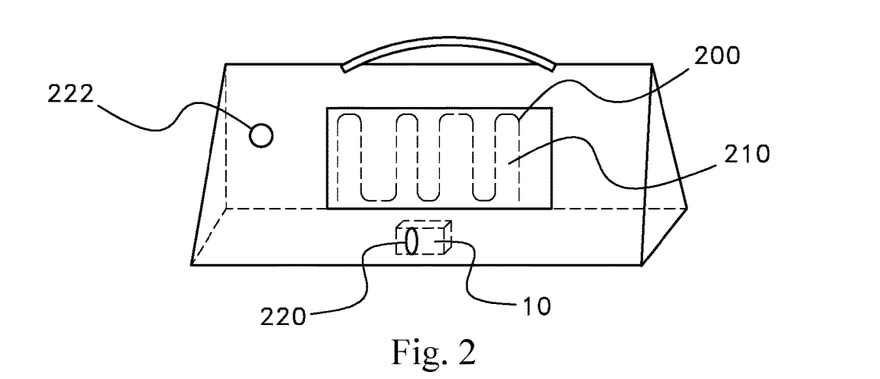
FIG. 2 shows one exemplary location of a purse illumination assembly with respect to a purse, according to the aspects of the present invention.
Figure 3:
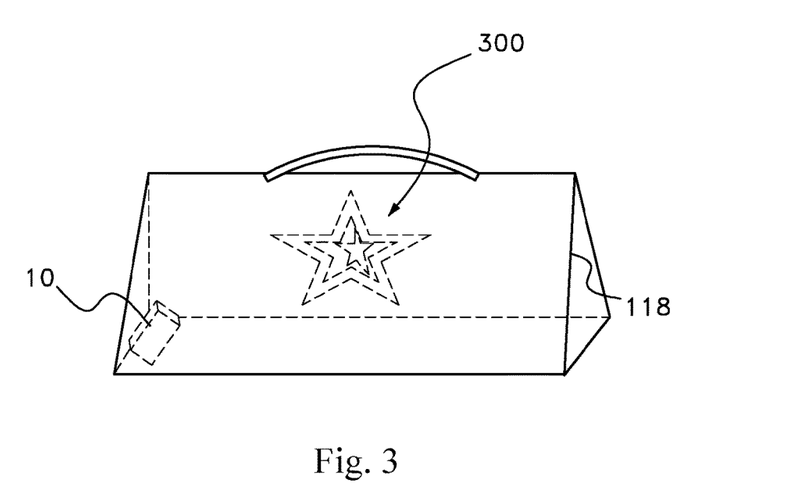
FIG. 3 shows one exemplary pattern of a purse illumination assembly, according to the aspects of the present invention.
Figure 4:
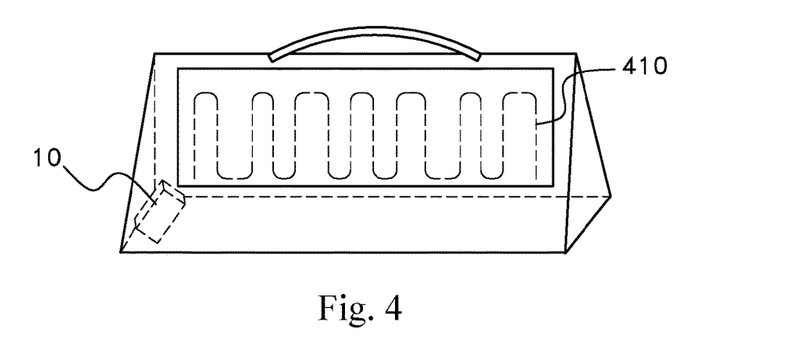
FIG. 4 shows another exemplary pattern of a purse illumination assembly, according to the aspects of the present invention.
Figure 5:
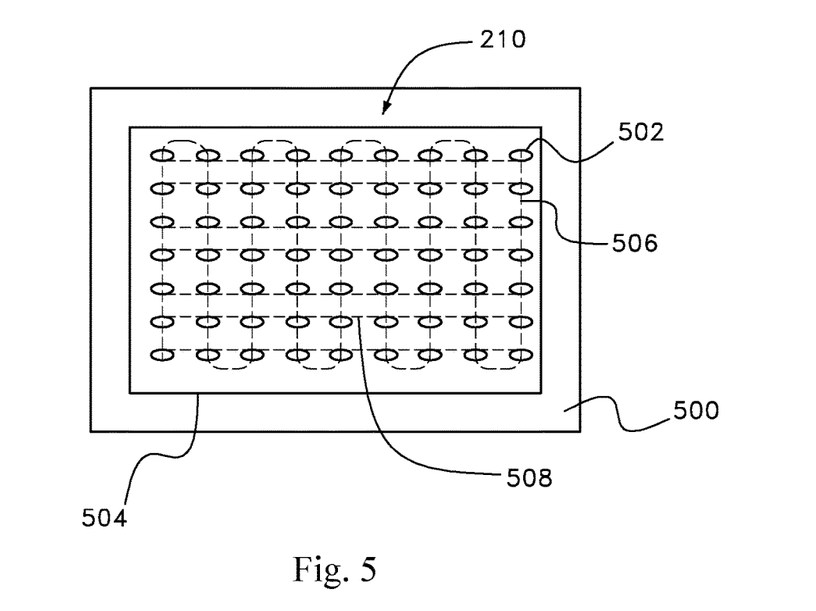
FIG. 5 shows a light fabric used as a part of a purse illumination assembly, according to the aspects of the present invention.

Aspects of the present invention with reference to FIG. 1 provide a purse illumination assembly. Aspects of the present invention with reference to FIG. 2, FIG. 3 and FIG. 4 provide a purse illumination assembly with light emitting fabric on the inside or outside of the purse. FIG. 5 shows a light fabric to be used as part of the purse illumination assembly of some aspects of the present invention.

EL wire may be used to produce a continuous line of light in other aspects of the invention. EL wire is a thin copper wire coated in a phosphor which glows when an AC Current is applied to it. Unlike other types of strand lights, EL wire is not a series of points but produces a 360 degree unbroken line of visible light. Its thin diameter makes it flexible and ideal for use in a variety of applications such as clothing or costumes.

Aspects of the present invention with reference to FIGS. 6 through 10 provide a flower purselight including a continuous light source in the form of a wand made from EL wire.

FIG. 1 shows a purse illumination assembly, according to the aspects of the present invention.

Referring to FIG. 1, a purse illumination assembly 10 is shown that includes a base housing unit 12 a circuit assembly 15, a light-emitting portion 20 and a touch activated switching means 16. The base housing unit 12 may have a generally rectangular shape with two ends, and four longitudinal sides. Other shapes are possible. At least one of these longitudinal sides may be a removable side providing access to the interior of the base housing unit 12 for tasks such as replacing a power source 18, or fixing other electrical elements in the base housing unit 12. The exterior of the base housing unit 12 may have two recessed indentations 17. According to one embodiment the recessed indentations 17 may contain the switching means 16. These two indentations 17 may be sufficiently deep as to shield the switching means 16 from inadvertent actuation by items contained within the purse but also sufficiently shallow to allow the user to intentionally actuate the switching means 16.

The base housing unit 12 may further comprise an attachment means 26 to yield a purse illumination assembly 10 that is removably attachable to the interior of the purse. The attachment means 26 may be a hook and loop fastener (such as Velcro hook and loop fastener) in which one side of the attachment means is affixed to the base housing unit 12 by an adhesive, and the other side of the attachment means is attached to the interior of the purse. Another possible attachment means may be a U shaped clip with a spring like closing effect. One side of the clip may be fixedly attached to a side of the housing 12, the other side may slip over an interior pocket of a purse providing a purse illumination assembly 10 that is secured to the interior of the purse.

The circuit assembly 15 is partially contained within the base housing unit 12. The circuit assembly 15 includes the switching means 16 exposed on the exterior of the base housing unit 12, the power source 18 and a timing circuit 14 providing a timed and regulated conveyance of electricity. The circuit assembly 15 may be further comprising a programmable circuit board. In this way, the light emitting portion can be lit according to a program. For example, the light emitting portion may blink, or provide different patterns. The programmable circuit board may be programmed through a USB or other cable, Bluetooth or the cloud. The switching means 16 may be touch sensitive switching means. The touch sensitive switching means 16 may extend through the base housing unit 12 and are exposed on the exterior of the base housing unit 12. The touch sensitive switching means 16 may also be exposed on the exterior of the light-emitting portion 20, and may be comprised of a first electrical contact 21 and a second electrical contact 23 which are non-intersecting. The bridging of the first contact 21 and second contact 23 will illuminate the light-emitting portion 20 for a given amount of time before automatically shutting off. The purse illumination assembly 10 may implement the timing circuit 14 as a capacitive timing circuit, which uses the charging and discharge of a capacitor, to regulate the duration of illumination. The purse illumination assembly may also further comprise a flash memory contained within the housing unit 12. There may also be a radio frequency tracking device in the purse illumination assembly, so that the device may be tracked, traced and recovered in the event of a loss or theft.

The power source 18 in communication with the circuit assembly 15 may include at least one disposable power cell, rechargeable cell or solar powered cell. The illumination assembly 10 may further comprise an electrical contact 27 partially contained within the base housing unit 12 in electrical communication with the power source 18. This electrical contact 27 allows a battery-charging device to be in removable electrical communication with the power source 18 of the purse illuminating assembly 10. The user may attach one end of a battery charging unit to the electrical contact 27 in communication with the illumination assembly power source 18, and the other end of the battery charging unit to a battery charger receptacle, providing a rechargeable purse illumination assembly 10.

Figure 11:
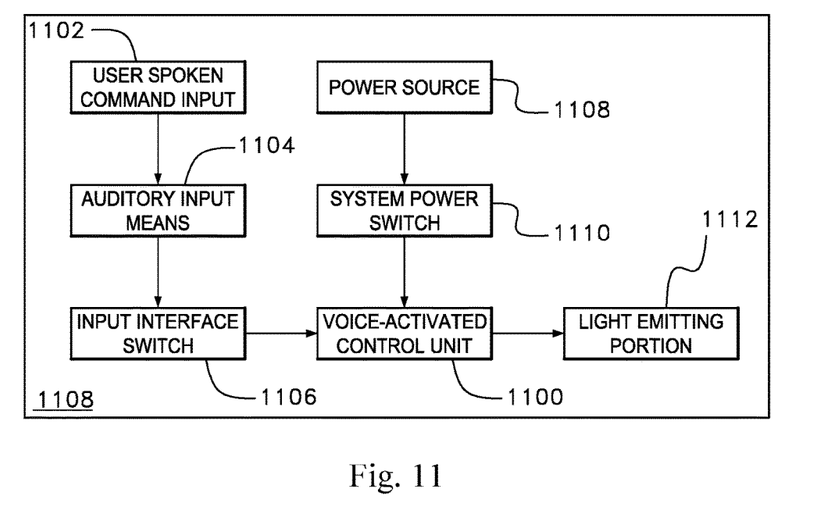
FIG. 11 depicts one aspect of the present invention.

FIG. 2 shows one exemplary location of a purse illumination assembly with respect to a purse, according to the aspects of the present invention. The light emitting portion 120, shown in FIG. 2, includes a light fabric 200. In contrast to the prior art discussed above, the light emitting fabric may illuminate either the inside or outside of the purse. The light emitting portion 210 is located along the side of the purse to provide illumination on the inside or outside of the purse. The remainder of the purse illumination assembly 10 includes a touch sensitive switching means 220 that may be comprised of two non-intersecting electrical contacts. In the embodiment shown in FIG. 3, the remainder of the purse illumination assembly 10 is placed such that the switching means 220 is on the outside of the purse. There may also be a voice activated switching means 222. A voice activated switching means may include, according to a preferred embodiment, a voice-activated control unit (1100), a auditory input means (1104) such as an input microphone, an input interface switch (1106), a system power switch (1110). The input interface switch (1106) is optional and may be used to turn off the voice control. For example, it may be undesirable in a noisy environment to have the voice activated switching means on. The voice-activated control unit (1100) may be, for example, a microcontroller, microprocessor or integrated circuit. The power source (1108) may be, for example, a battery and there may be a circuit assembly (1108) connecting the light emitting portion (1112) to the power source (1108) through the voice activated control unit (1100).

FIG. 3 shows one exemplary pattern of a purse illumination assembly, according to the aspects of the present invention.

When light fabric is used as the light emitting portion, the light emitting portion may take various forms. FIG. 3 shows a light emitting portion 300 that takes the shape of a star. In some aspects of the present invention, the voice activated switching means is able to call up certain shapes in response to voice activated commands. For example, the user may say "Star" and the star shaped light emitting portion 300 may light up. The light emitting fabric may be sequenced to provide a dynamic display. For example, the star 100 may flash or turn into a circle or a video depicting movement. In the embodiment shown in FIG. 3, the remainder of the purse illumination assembly 10 is placed completely inside the purse.

FIG. 4 shows another exemplary pattern of a purse illumination assembly, according to the aspects of the present invention.

In FIG. 4, the light emitting portion 410 is similar to the light emitting portion 210 of FIG. 2 but occupies a larger area. In the embodiment shown in FIG. 4, the remainder of the purse illumination assembly 10 is placed completely inside the purse.

FIG. 5 shows a light emitting fabric used as a part of a purse illumination assembly, according to the aspects of the present invention.

The light emitting fabric 500 may be comprised of a piece of fabric with arrays of LED pixels 502 mounted on a flexible substrate 504 and having an electrically conducting track 506 on the flexible substrate 504 connecting the LED Pixels 502 to a controlling circuit and power source. FIG. 5 shows a variety a 1-Dimensional arrays of LED pixels. The electrically conducting track may include circuits for separately controlling each of the pixels. The flexible substrate 504 may be plastic. The LED pixels 502 may each contain red, green and blue (RGB) LEDs such that each pixel may create various colors as a combination of these lights. There may also be a waveguide 508 between the LED pixels to conduct the light. Flash memory may be used in communication with the light emitting fabric.

Figure 6:
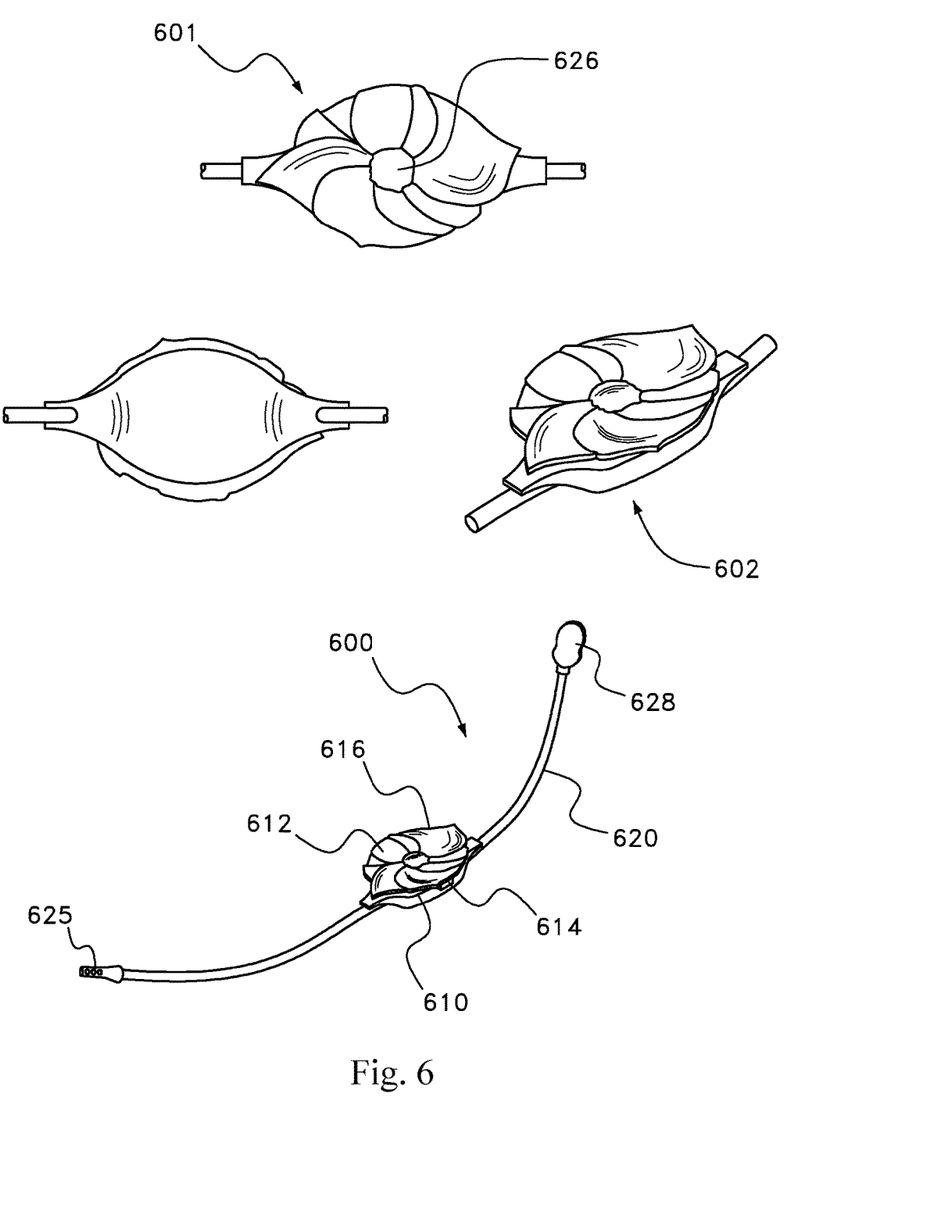
FIG. 6 shows various views of a flower purselight according to other aspects of the present invention.

FIG. 6 shows various views of a flower purselight according to other aspects of the present invention.

The purselight 600 of FIG. 6 is configured to look like a flower. Other appropriate shapes may be used. Also, this and variations of this embodiment may be used in combination with the light fabric shown in the preceding drawings.

FIG. 6 shows a plan view 601, an isometric view 602 and a bottom view 603 of the flower purselight 600. The flower purselight 600 includes a flower portion 610 and a wand portion 620. The flower portion 610 includes an embedded LED 612, a touch-sensitive switch 614 and an interchangeable cover 616 or cap. The wand portion 620 includes an end cap for fiber optics or EL light. According to another embodiment, the voice activated switching means may be in the end cap 628 or contained in the flower portion 610. By way of example, the center 626 of the flower portion 610 or the end cap 628 could contain an auditory input means microphone. In this way, a user may say "ON" and the auditory input means would accept the command, the control unit would recognize this as directing the light to go on an issue a directive to the input interface switch to turn on the light.

In one aspect, the wand 620 is made from EL wire that provides even coverage and a continuous light. Hot spots from the use of several LEDs are avoided when EL wire, fiber optics, or phosphorous coated plastic are used for the wand material. Using crystals around the wand helps diffuse the light. The crystals may be engraved, die cut, embellished, decorative and stamped.

Figure 7:
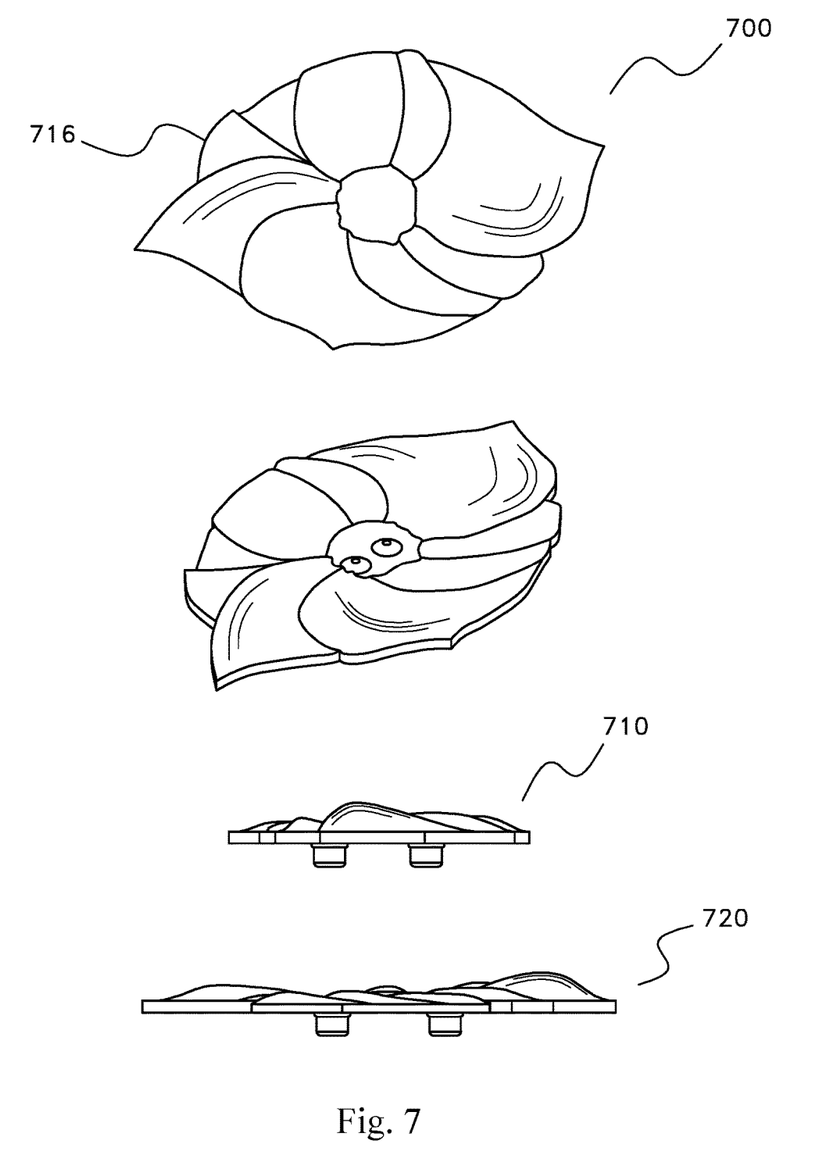
FIG. 7 shows exemplary dimensions for the flower purselight of FIG. 6.

FIG. 7 shows exemplary dimensions for the flower purselight of FIG. 6.

One set of exemplary dimensions for the flower shown in FIG. 6 are shown in FIG. 7. The plan view 700 shows an exemplary length of 3.580 inches and an exemplary width of 2.291 inches. A first side view 710 and a second side view 720 show an exemplary thickness of 0.275 inches.

Figure 8:
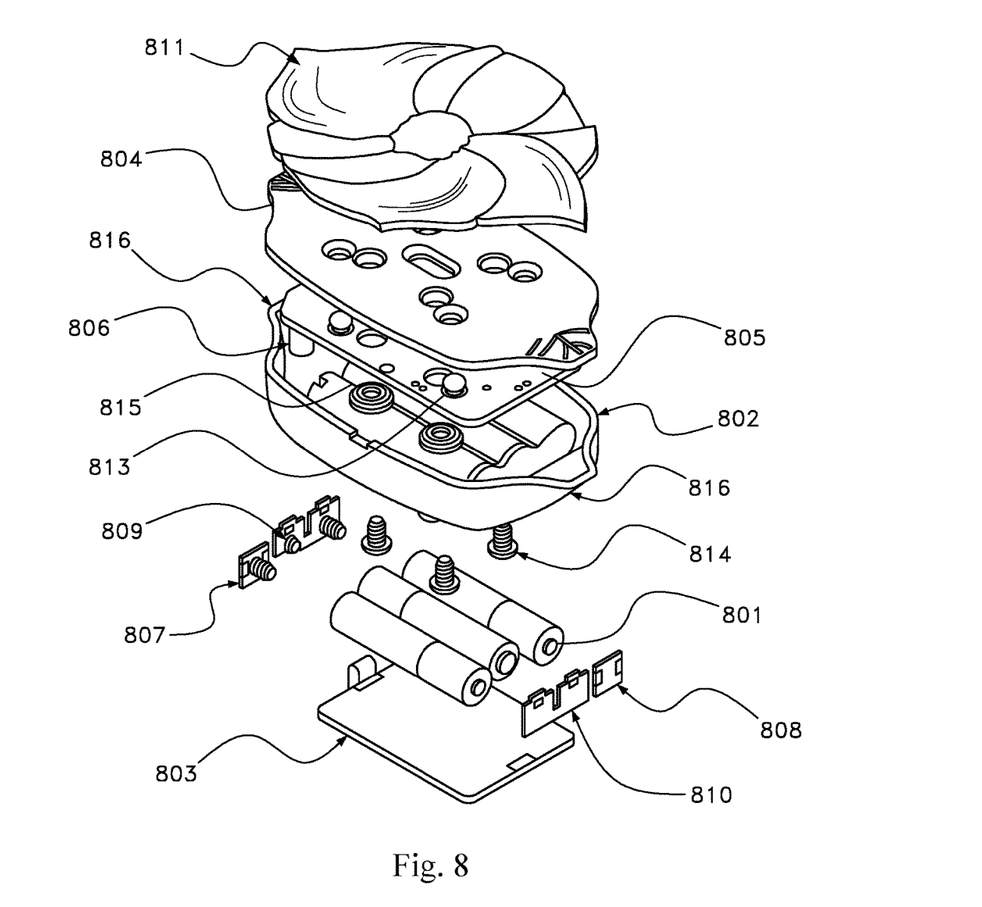
FIG. 8 shows an exemplary exploded view of the flower purselight of FIG. 6.

FIG. 8 shows an exemplary exploded view of the flower purselight of FIG. 6.

Exemplary components to be used in an exemplary flower 800 that is used in the purselight of FIG. 6 are shown in FIG. 8. The flower 800 includes batteries 801, a base 802, a battery door 803, a leaf part 804 under the flower, a circuit 805, a cap 806, a resistive spring 807, a positive button 808, right and left contacts 809, 810, a flower cover 811, a transformer 812, an LED 813, screws 814 and contact table 815. The various components are assembled to provide DC current from the batteries 801 to the LED 813. The base 802 permits the EL wires to enter through EL wire connections 816 and receive AC power from the transformer. The circuit 805 provides the appropriate power to each component.

Figure 9:
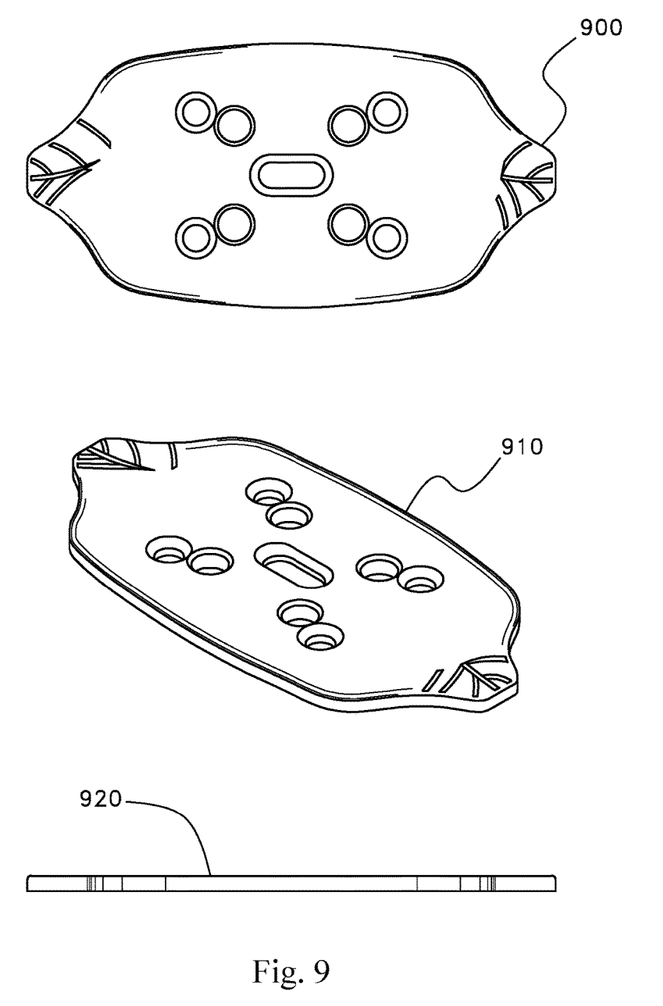
FIG. 9 shows exemplary dimensions for a leaf part of the flower shown in FIG. 6.

FIG. 9 shows exemplary dimensions for a leaf part of the flower shown in FIG. 6.

One exemplary set of dimensions for the leaf part 804 of FIG. 8 are shown in FIG. 9. A plan view 900, an isometric view 910 and a side view 920 are shown. The exemplary dimensions are shown as 3.950×2.000×0.125 inches.

Figure 10A:
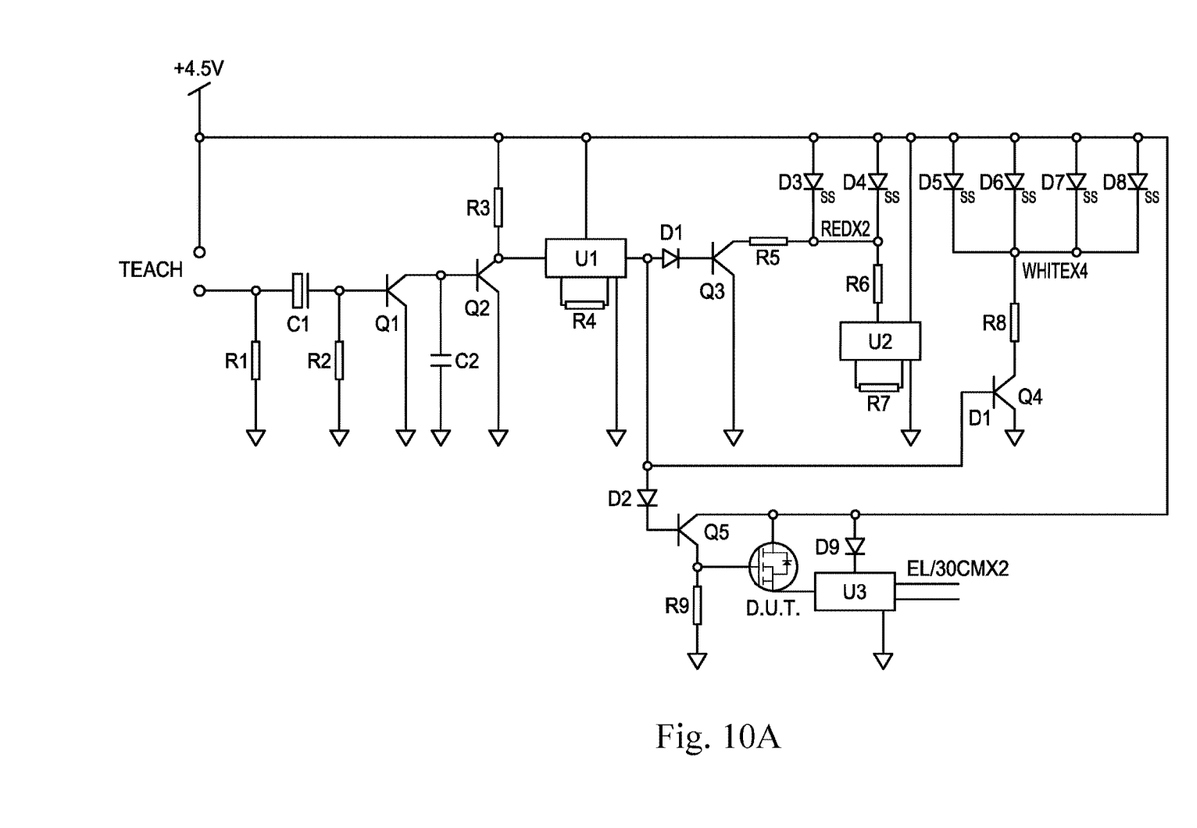
FIG. 10A shows an exemplary driver for the lights used in the flower purselight of FIG. 6.

FIG. 10A shows an exemplary driver for the lights used in the flower purselight of FIG. 6.

FIG. 10A shows one exemplary implementation of the circuit 805 of FIG. 8 that forms a driver circuit for the LED of the flower portion 610 as well as the EL wire for the wand portion 620 of the flower purselight of FIG. 6.

FIG. 10B shows implementation parameters for the driver of FIG. 10A.

FIG. 10B provides a table that shows specifications for a driver circuit of FIG. 10A.

Figure 12:
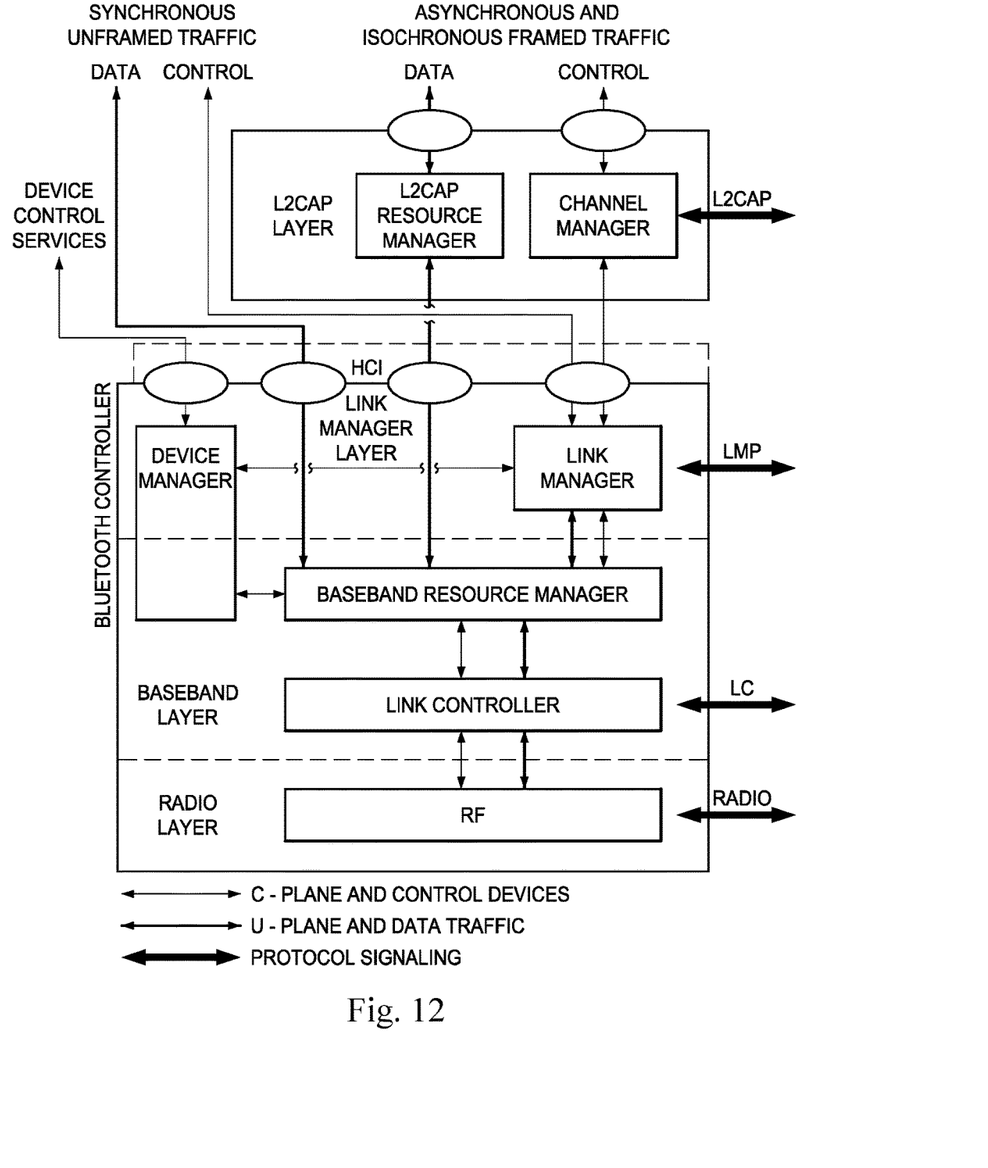
FIG. 12 depicts an example of a Bluetooth core system architecture.

As mentioned above, a combination of the above features may be used for illuminating the inside and outside of a purse. An additional feature of the present invention is a Bluetooth system in communication with the circuit assembly. FIG. 12 depicts an example of a Bluetooth® system architecture, as described by Bluetooth®, The Bluetooth® core system covers the four lowest layers and associated protocols defined by the Bluetooth specification as well as one common service layer protocol, the service discovery protocol (SDP) and the overall profile requirements specified in the generic access profile (GAP). The lowest three layers are sometimes grouped into a subsystem known as the Bluetooth controller. This is a common implementation involving a standard physical communications interface between the Bluetooth controller and remainder of the Bluetooth system including the L2CAP, service layers and higher layers (known as the Bluetooth host). Although this interface is optional, the architecture design allows for its existence and characteristics. The Bluetooth specification enables interoperability between independent Bluetooth enabled systems by defining the protocol messages exchanged between equivalent layers, and also interoperability between independent Bluetooth sub-systems by defining a common interface between Bluetooth controllers and Bluetooth hosts. FIG. 12 depicts a number of functional blocks are shown and the path of services and data between these. The functional blocks shown in the diagram are informative. In general, the Bluetooth specification does not define the details of implementations except where this is required for interoperability. Standard interactions are defined for all inter-device operation, where Bluetooth devices exchange protocol signaling according to the Bluetooth specification. The Bluetooth core system protocols are the radio (RF) protocol, link control (LC) protocol, link manager (LM) protocol and logical link control and adaptation protocol (L2CAP), all of which are fully defined in subsequent parts of the Bluetooth specification. In addition, the service discovery protocol (SDP) is a service layer protocol required by all Bluetooth applications. The Bluetooth core system offers services through a number of service access points that are shown in the diagram as ellipses. These services consist of the basic primitives that control the Bluetooth core system. The services can be split into three types. There are device control services that modify the behavior and modes of a Bluetooth device, transport control services that create, modify and release traffic bearers (channels and links), and data services that are used to submit data for transmission over traffic bearers. It is common to consider the first two as belonging to the C-plane and the last as belonging to the U-plane. A service interface to the Bluetooth controller sub-system is defined such that the Bluetooth controller may be considered a standard part. In this configuration the Bluetooth controller operates the lowest three layers and the L2CAP layer is contained with the rest of the Bluetooth application in a host system. The standard interface is called the host to controller interface (HCI). Implementation of this standard service interface is optional. As the Bluetooth architecture is defined with the possibility of a separate host and controller communicating through an HCI, a number of general assumptions are made. The Bluetooth controller is assumed to have limited data buffering capabilities in comparison with the host. Therefore, the L2CAP layer is expected to carry out some simple resource management when submitting L2CAP PDUs to the controller for transport to a peer device. This includes segmentation of L2CAP SDUs into more manageable PDUs and then the fragmentation of PDUs into start and continuation packets of a size suitable for the controller buffers, and management of the use of controller buffers to ensure availability for channels with quality of service (QoS) commitments. The device manager is the functional block in the baseband that controls the general behavior of the Bluetooth enabled device. It is responsible for all operation of the Bluetooth system not directly related to data transport, such as inquiring for the presence of other nearby Bluetooth enabled devices, connecting to other Bluetooth enabled devices or making the local Bluetooth enabled device discoverable or connectable by other devices. The device manager requests access to the transport medium from the baseband resource controller in order to carry out its functions. The device manager also controls local device behavior implied by a number of the HCI commands, such as managing the device local name, any stored link keys, and other functionality. The link manager is responsible for the creation, modification, and release of logical links (and, if required, their associated logical transports), as well as the update of parameters related to physical links between devices. The link manager achieves this by communicating with the link manager in remote Bluetooth devices using the link management protocol (LMP). The LMP allows the creation of new logical links and logical transports between devices when required, as well as the general control of link and transport attributes such as the enabling of encryption on the logical transport, the adapting of transmit power on the physical link or the adjustment of QoS settings for a logical link. The baseband resource manager is responsible for all access to the radio medium. It has two main functions. At its heart is a scheduler that grants time on the physical channels to all of the entities that have negotiated an access contract. The other main function is to negotiate access contracts with these entities. An access contract is effectively a commitment to deliver a certain QoS that is required in order to provide a user application with an expected performance. The access contract and scheduling function must take account of any behavior that requires use of the Bluetooth radio. This includes, for example, the normal exchange of data between connected devices over logical links and logical transports, as well as the use of the radio medium to carry out inquiries, make connections, be discoverable or connectable, or to take readings from unused carriers during the use of AFH mode. In some cases, the scheduling of a logical link results in changing to a different physical channel from the one that was previously used. This may be, for example, due to involvement in scatternet, a periodic inquiry function, or page scanning. When the physical channels are not time slot aligned, then the resource manager also accounts for the realignment time between slots on the original physical channel and slots on the new physical channel. In some cases, the slots naturally align due to the same device clock used as a reference for both physical channels. The link controller is responsible for the encoding and decoding of Bluetooth packets from the data payload and parameters related to the physical channel, logical transport and logical link. The link controller carries out the link control protocol signaling (in close conjunction with the scheduling function of the resource manager), which is used to communicate flow control and acknowledgement and retransmission request signals. The interpretation of these signals is a characteristic of the logical transport associated with the baseband packet. Interpretation and control of the link control signaling is normally associated with the resource manager's scheduler. The RF block is responsible for transmitting and receiving packets of information on the physical channel. A control path between the baseband and the RF block allows the baseband block to control the timing and frequency carrier of the RF block. The RF block transforms a stream of data to and from the physical channel and the baseband into required formats.

As will be appreciated by the user, the Bluetooth® system may be used to control the light emitting portion to turn on and off the light emitting portion. Also, it may be used to tell the light emitting portion to turn on and off according to a program. For example, the light emitting portion may light up according to a pattern and/or rhythm which may be selected on a computing device and communicated to the device by the Bluetooth® system. The program may also be accomplished through a USB or other cable or the cloud.

The present invention has been described in relation to particular examples, which are intended to be illustrative rather than restrictive, with the scope and spirit of the invention being indicated by the following claims and their equivalents.

The invention claimed is:

1. A purse illumination assembly, comprising:
   a power source;
   a light emitting portion having a piece of fabric, a flexible substrate attached to the piece of fabric, arrays of LED pixels mounted on the flexible substrate, a waveguide positioned between said LED pixels; and an electrically conducting track on said flexible substrate connecting and controlling the LED pixels;
   a voice activated switching means comprising a control unit and an auditory input means in communication with the control unit; and
   a circuit assembly connecting the light emitting portion to the power source through the control unit.

2. The purse illumination assembly of claim 1, wherein the circuit assembly includes a capacitive timing circuit to turn the light off after a predetermined period.

3. The purse illumination assembly of claim 1, wherein said light emitting portion is a light emitting fabric selected from the group consisting of electroluminescent strips, electroluminescent panels, textile imbedded with LED, OLED, optical fibers or black light.

4. The purse illumination assembly of claim 1, wherein each said LED pixel contains red, green and blue (RGB) LEDs.

5. The purse illumination assembly of claim 1, wherein said light emitting portion is a light emitting fabric encased in translucent water resistant material.

6. The purse illumination assembly of claim 1, wherein said light emitting portion is used to illuminate an inside of a purse and an outside of the purse.

7. The purse illumination assembly of claim 1, wherein the light emitting portion includes a light emitting fabric.

8. The purse illumination assembly of claim 1, wherein the power source is a solar charged power source.

9. The purse illumination assembly of claim 1, wherein the circuit assembly is further comprising a programmable circuit board.

10. The purse illumination assembly of claim 1, further comprising a radio frequency tracking device.

11. The purse illumination assembly of claim 1, further comprising a Bluetooth system in communication with the circuit assembly.

12. A purse illumination assembly for illuminating a purse, comprising:
   a power source, wherein the power source is a solar charged power source;
   a light emitting portion;
   a switching means;
   a circuit assembly connecting the light emitting portion to the power source through the switching means,
   wherein the light emitting portion includes an EL wire, and a LED light both being driven by a driver circuit of the circuit assembly,
   a casing for the LED light, wherein the casing of the LED light has interchangeable decorative caps.

13. The purse illumination assembly of claim 12, wherein the EL wire is shaped as a wand portion.

14. The purse illumination assembly of claim 13, wherein the wand portion has crystals around the wand portion that diffuse light.

15. The purse illumination assembly of claim 14, wherein the crystals are selected from the group consisting of engraved, die cut, embellished, decorative and stamped.

16. The purse illumination assembly of claim 12, wherein the circuit assembly includes a transformer.

17. The purse illumination assembly of claim 12, wherein the power source is rechargeable.

18. The purse illumination assembly of claim 12, wherein the light emitting portion further includes a light emitting fabric.

19. The purse illumination assembly of claim 12, wherein the switching means is a voice activated switching means.

20. The purse illumination assembly of claim 12, wherein the voice activated switching means is further comprising a control unit and an auditory input means.

21. The purse illumination assembly of claim 20, wherein the auditory input means is located on an end portion of the EL wire.

22. The purse illumination assembly of claim 12, wherein the switching means is a touch sensitive switching means.

23. The purse illumination assembly of claim 12, wherein the switching means is located on a casing of the LED light.

24. The purse illumination assembly of claim 12, wherein the circuit assembly is further comprising a programmable circuit board.

25. The purse illumination assembly of claim 12, further comprising a radio frequency tracking device.

26. A purse illumination assembly for illuminating a purse, comprising:
   a power source;
   a light emitting portion;
   a switching means;
   a circuit assembly connecting the light emitting portion to the power source through the switching means,
   a Bluetooth system in communication with the circuit assembly,
   wherein the light emitting portion includes an EL wire, and a LED light both being driven by a driver circuit of the circuit assembly,
   a casing for the LED light, wherein the casing of the LED light has interchangeable decorative caps.

* * * * *